(12) United States Patent
Andruska et al.

(10) Patent No.: US 6,408,066 B1
(45) Date of Patent: Jun. 18, 2002

(54) ACD SKILL-BASED ROUTING

(75) Inventors: Donald Lee Andruska, Glen Ellyn; Douglas Anthony Deutsch, Aurora, both of IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/461,885

(22) Filed: Dec. 15, 1999

(51) Int. Cl.[7] .......................... H04M 3/523; H04Q 3/64
(52) U.S. Cl. .......................... 379/265.12; 379/265.13; 379/266.02
(58) Field of Search .................. 379/265, 266, 379/309, 265.01, 265.02, 265.11, 265.12, 265.13, 266.01, 266.02

(56) References Cited

U.S. PATENT DOCUMENTS

| | | | |
|---|---|---|---|
| 5,206,903 A | | 4/1993 | Kohler et al. ............... 379/309 |
| 5,335,269 A | * | 8/1994 | Steinlicht ................... 379/266 |
| 5,703,943 A | | 12/1997 | Otto .......................... 379/265 |
| 5,825,869 A | * | 10/1998 | Brooks et al. ............... 379/265 |
| 5,828,747 A | | 10/1998 | Fisher et al. ............... 379/309 |
| 5,857,018 A | * | 1/1999 | Sumner et al. .............. 379/266 |
| 6,088,441 A | * | 7/2000 | Flockhart et al. ........ 379/266 X |
| 6,185,292 B1 | * | 2/2001 | Miloslavsky ................ 379/265 |

* cited by examiner

*Primary Examiner*—Harry S. Hong
(74) *Attorney, Agent, or Firm*—Walter W. Duft

(57) ABSTRACT

In a disclosed ACD skill-based routing system and method, a group of call agents is established and one or more screening attributes are assigned to each call agent group member. A call agent queue is established that ranks available call agent group members according to an idleness indicator. The call agent group is assigned to at least one call queue that ranks calls according to a priority indicator. Each call in the call queue(s) is associated with one or more call requirement attributes. To assign a call to an agent, a comparison is made of the screening attribute(s) of the highest ranking call agent in the call agent queue with the call requirement attribute(s) of one or more calls in the call queue(s), beginning with the highest ranking call and descending through lower ranking calls as necessary until a call having a call requirement attribute matching one of the highest ranking call agent's screening attributes (call-to-agent match) is found. The call associated with the call-to-agent match is then assigned to the highest ranking call agent and the highest ranking call agent is removed from the call agent queue.

21 Claims, 3 Drawing Sheets

ACD SKILL-BASED ROUTING

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates to automated call distribution (ACD). More particularly, the invention concerns an ACD call routing environment in which incoming calls are screened and assigned to available agents in a manner that treats all agents equitably.

2. Description of the Prior Art

ACD systems use automated procedures to assign incoming and outgoing calls to available call agents employed to handle the calls. Calls are typically placed in call queues to await handling by agents within groups of agents assigned to handle one or more of the call queues. The agents within the agent groups are usually queued in order to effectuate orderly call assignment. In the simplest call assignment arrangement, the oldest call in the one or more call queues served by an agent group is assigned to the most-idle agent in the agent queue, i.e., the agent at the head of the queue. This call assignment scheme seeks to achieve equity among agents, who are typically graded and compensated on the basis of call volume. Assigning calls to the longest waiting agent theoretically allows all agents to handle an equal number of calls such that the agents will spend an equal amount of time in a non-idle work state.

More recently, it has been observed that customer satisfaction can be improved if call agent skills are matched to the requirements of particular calls. For example, if a calling or called party speaks Spanish, the call should be assigned to a Spanish speaking agent rather than an agent who speaks only English. Various agent skill-matching algorithms have been proposed for improving call-to-agent skill matching. Typically, these skill-matching algorithms are implemented at the expense of agent equity. For example, U.S. Pat. No. 5,206,903 of Kohler et al. discloses a skill-matching algorithm wherein calls are assigned by searching across a split (i.e., a group) of available agents to identify an agent with the best skill match. According to this algorithm, the most idle agent will not receive the call if the agent's skills do not match the requirements of the call being searched. A lower priority agent with a better skill match will be assigned the call, in which case the most idle agent must wait for another call in the call queue. U.S. Pat. No. 5,828,747 discloses another skill-matching algorithm wherein agents sharing the same skill are assigned skill levels that are used to position the agents in an agent queue associated with the shared skill. According to this algorithm, agents with the highest skill levels are given priority in the agent queue even though they may have handled more calls than the other agents.

A further disadvantage of prior art skill-matching algorithms is that agents with multiple or unique skills may be assigned calls that do not require more than normal skills. This has several consequences. First, assigning low level calls to uniquely-skilled agents may cause delay in the assignment of high level calls that must wait for another uniquely-skilled agent to become available. Second, the talents of the uniquely-skilled agents are underutilized. Third, the uniquely-skilled agents tend to win out over peers whose skills are less diverse. Consider, for example, a call center that receives both English language and Spanish language calls and in which some of the agents speak only English and others speak both English and Spanish. In accordance with conventional skill-matching algorithms, the bilingual agents would receive all of the Spanish language calls and some of the English language calls. English speaking agents would receive only English language calls. Statistically, the bilingual agents would tend to handle more calls then their English-speaking counterparts. Many of these calls (i.e., the English language calls) could be handled by English-only agents if the uniquely skilled agents were bypassed relative to such calls, but current skill matching algorithms do not operate in this manner; they assign calls whenever a minimum specified level of skill matching is found.

Accordingly, there is a need in an ACD system for an agent assignment scheme that provides agent skill matching, so as to enhance customer satisfaction, without sacrificing agent equity. Applicants submit that the principal problem of prior art skill-matching algorithms is that they tend to be call-centric and not agent-centric; i.e., they attempt to match calls to agents rather than agents to calls. What is therefore required, in Applicants' view, is an alternative to the call-centric approach of the past. An agent-centric environment is needed in which emphasis is placed on assigning calls to the highest priority agents, albeit consistent with the agents' skills. In addition, an ACD screening environment is required in which care is taken to protect agents with less diversified skills relative to multi-skilled agents who have the ability to field a wider array of calls, such that the less diversified agents are able to compete effectively for all calls that they are qualified to handle.

SUMMARY OF THE INVENTION

The foregoing problems are solved and an advance in the art is obtained by a novel ACD skill-based routing system and method. In accordance with a preferred embodiment of the invention disclosed herein, a group of call agents is established and one or more screening attributes are assigned to each call agent group member. A call agent queue is also established that ranks available call agent group members according to an idleness indicator. The call agent group is assigned to at least one call queue that ranks calls according to a priority indicator. Each call in the call queue(s) is associated with one or more call requirement attributes.

As part of call screening to assign a call to an agent, a comparison is made of the screening attribute(s) of the highest ranking call agent identified in the call agent queue with the call requirement attribute(s) of one or more calls in the call queue(s), beginning with the highest ranking call and descending through lower ranking calls, until a call having a call requirement attribute matching one of the highest ranking call agent's screening attributes (call-to-agent match) is found. The call associated with the call-to-agent match is then assigned to the highest ranking call agent and the highest ranking call agent is removed from the call agent queue.

In the event that no call-to-agent match is found relative to the highest ranking call agent, the system can wait until a call arrives that does match the highest ranking agent. Preferably, however, the highest ranking agent is temporarily bypassed so that additional call-to-agent comparisons can be made relative to one or more subsequent call agents in the call agent queue until a call-to-agent match is found. At that point, the call associated with the call-to-agent match is assigned to the call agent associated with the call-to-agent match. The system may then return to the highest ranking call agent and re-perform call screening relative to that agent.

The idleness indicator can be based on a variety of criteria, such as the time that a call agent has been available to handle a call. The priority indicator can also be based on a variety of criteria, such as the time that a call has been waiting for handling (with or without Ratio Delay Queuing).

In some embodiments of the invention, the call agent group may be assigned to a single call queue and call screening may include considering calls in the call queue in accordance with their call queue ranking until a call-to-agent match is found. In other embodiments of the invention, the call agent group may be assigned to multiple call queues and call screening may include considering calls in the multiple call queues in accordance with their overall ranking relative to other calls in the multiple call queues until a call-to-agent match is found.

The call agent group members can have differing screening attributes. Some may have specialized screening attributes indicative of specialized skills in addition to a common set of non-specialized screening attributes indicative of non-specialized skills shared with other call agent group members. In that case, call screening may include waiting for a call with a matching specialized call requirement attribute before assigning the call to the highest ranking call agent. If no such call is found, the highest ranking call agent may then be assigned a call having a matching non-specialized call requirement attribute. In this way, high level calls are handled quickly, the agent's unique skills are utilized effectively, and normally-skilled agents are not disadvantaged.

BRIEF DESCRIPTION OF THE DRAWING

The foregoing and other features and advantages of the invention will be apparent from the following more particular description of a preferred embodiment of the invention, as illustrated in the accompanying Drawing, in which.

DETAILED DESCRIPTION OF THE PREFERRED EMBODIMENT

Figure 1:
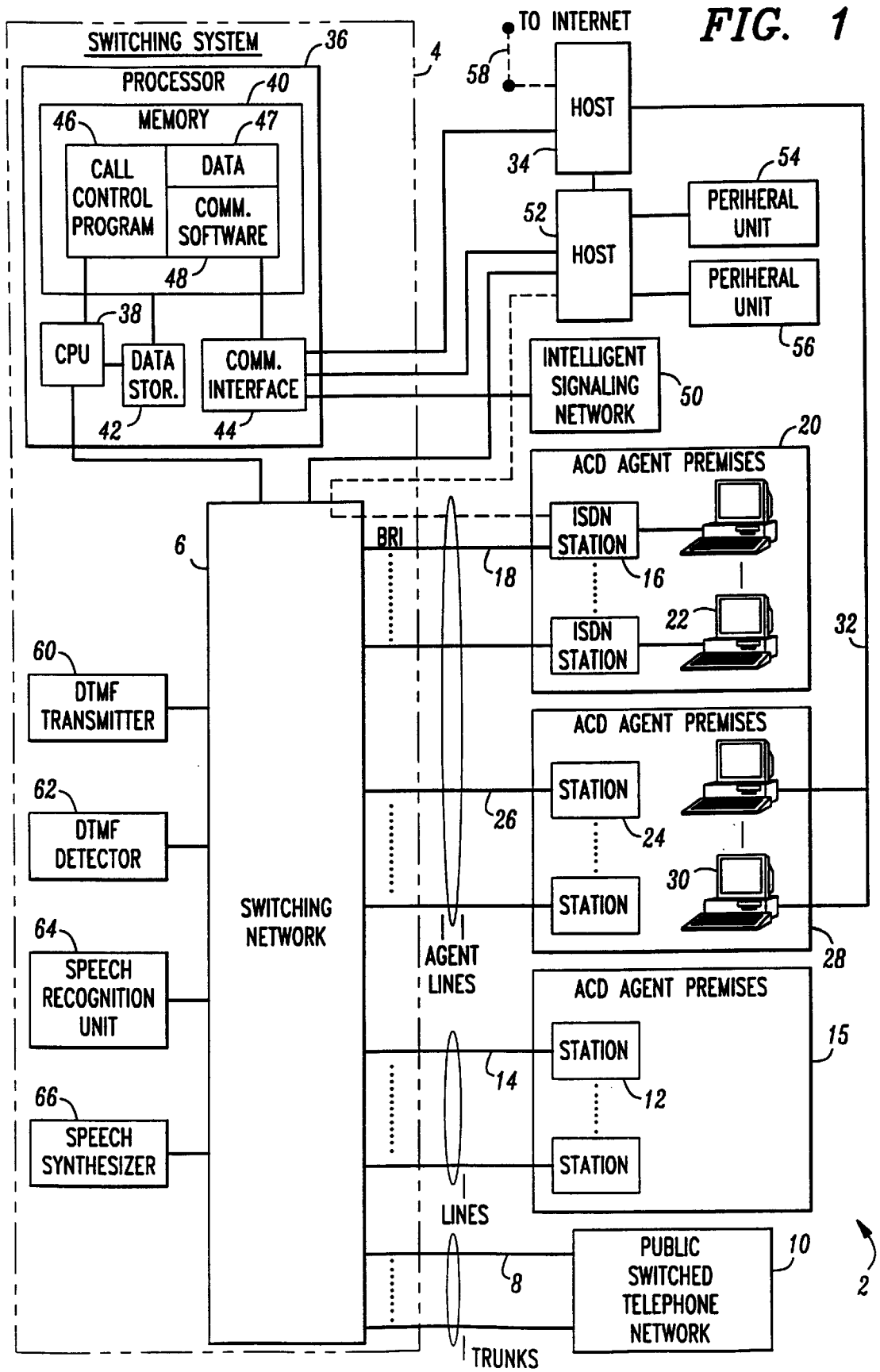
FIG. 1 is a block diagram showing relevant portions of an exemplary ACD system constructed in accordance with the invention.

Turning now to the figures, wherein like reference numerals represent like elements in all of the several views, FIG. 1 illustrates an exemplary ACD system 2 that is implemented, by way of example only, using processing resources provided by a telephone service provider Central Office (CO) switching system 4. Except as modified by the present invention, the switching system 4 is conventional in nature. Thus, it includes the usual switching network 6 that makes call connections on behalf of local telephone subscriber equipment connected the switching system 4. As is known, such call connections can be made to other local subscriber equipment served by the switching system 4, or to non-local equipment that communicates with the switching system 4 via trunks 8 extending to the Public Switched Telephone Network (PSTN) 10.

The switching network 6 is shown in FIG. 1 as being connected to local subscriber equipment that is associated with ACD activities. This ACD equipment includes plural analog stations 12 (e.g. analog telephones) that connect to the switching network 6 via local loop POTS (Plain Old Telephone Service) lines 14. The stations 12 are used without data terminals and thus are "voice-only." They are shown as being located at ACD agent premises 15, where agents would typically be employed to operate the stations 12 as part of the operations of a call center subscriber. Additional ACD equipment connected to the switching network 6 may include ISDN (Integrated Services Digital Network) stations 16. These stations communicate with the switching network 6 via BRI (Basic Rate ISDN) lines 18 that extend therefrom to ACD agent premises 20, where the ISDN stations 16 are located. Unlike the analog stations 12, each ISDN station 16 is associated with a data terminal 22, such as a personal computer, that connects to the ISDN station via an RS 232 serial channel or the like. During ACD operations, agents would typically operate both an ISDN station 16 and an associated data terminal 22. Additional ACD equipment connected to the switching network 6 may include analog stations 24. These stations communicate with the switching network 6 via POTS lines 26 that extend therefrom to ACD Agent Premises 28, where the analog stations are located. Unlike the analog stations 12, each analog station 24 is associated with a data terminal 30, such as a personal computer. Unlike the ISDN stations 16, which are digital, there is no communication link between the analog stations 24 and the data terminals 30. Instead, data is provided to the data terminals 30 via a network connection 32 from a Local Area Network (LAN) host 34.

It will be understood that the ACD agent premises 15, 20 and 28 may be associated with separate call center subscribers, or they may represent ACD resources for a single distributed call center subscriber. A large call center subscriber may likewise utilize ACD agent premises connected to other switching systems that have their own integrated ACD systems. In that case, the ACD system 2 would be implemented to operate in conjunction with the other ACD systems such that calls could be routed between all ACD agent premises owned by the call center subscriber on an as-needed basis.

The switching system 4 may be exemplified by a 5ESS™ switch from Lucent Technologies, Inc. This switch features a data processor 36 that includes a CPU (Central Processing Unit) 38, a memory 40, a data storage system 42 (e.g., a disk drive), and a data communication interface 44. ACD functionality is provided by a call control software program 46 resident in the memory 40. This program may be exemplified by the PINNACLE™ software product from Lucent Technologies, Inc. The PINNACLE™ product implements a centrex-based ACD system wherein ACD control functions are performed at the telephone service provider's CO on behalf of agents located at remote locations, such as the ACD Agent Premises 15, 20 and 28. A centrex-based ACD system allows each line of a call center subscriber to be called directly from the outside by having each line provided with a telephone number. In addition, calls to the call center subscriber's main number(s) can be distributed to individual lines of the centrex. Although not shown, an ACD system in accordance with the invention could also be implemented at a call center subscriber premises, e.g., in a PBX (Private Branch Exchange) system.

During ACD operations, the call control program 46 uses data 47 that is either resident in the memory 40 or which can be pulled into the memory 40 from the data storage system 42. The data 47 may include long term information such as the features available to particular customers and the lines that are associated with each telephone number of a call center subscriber. The data 47 also includes transient data representing the present state of calls in the ACD system 2 for call center subscribers. Communication software 48 controls communications between the data communication interface 44 and outside entities such as a signaling network 50, the network host processor 34 and another network host processor 52. The signaling network 50 is used for conventional intelligent network signaling. The network hosts 34 and 52 are used to communicate data across local area networks, one of which includes the agent terminals 30, using a communication protocol such as TCP/IP. The network host 52 is shown as being connected to the network host 34 and also to a pair of peripheral units 54 and 56. These units are used for conventional storage and/or data communications. The network host 34 is shown as having an optional connection 58 to an outside data network, such as the public Internet. This allows call agents operating the data terminals 30 to communicate with callers via email, IRC (Internet Relay Chat), VoIP (Voice over Internet) and other forms of data communication. The network hosts 34 and 52 are typically administered by individual call center subscribers and contain data supplied by those subscribers. This is in contrast to the data 47 which is preferably maintained under the control of and/or supplied by the administrator of the switching system 4.

Additional components of the switching system 4 include a DTMF (Dual Tone Multiple Frequency) transmitter 60, a DTMF Detector 62, a speech recognition unit 64, and a speech synthesizer 66. These components are conventional in nature and used for generating and detecting normal advisory tones and messages.

Figure 2:
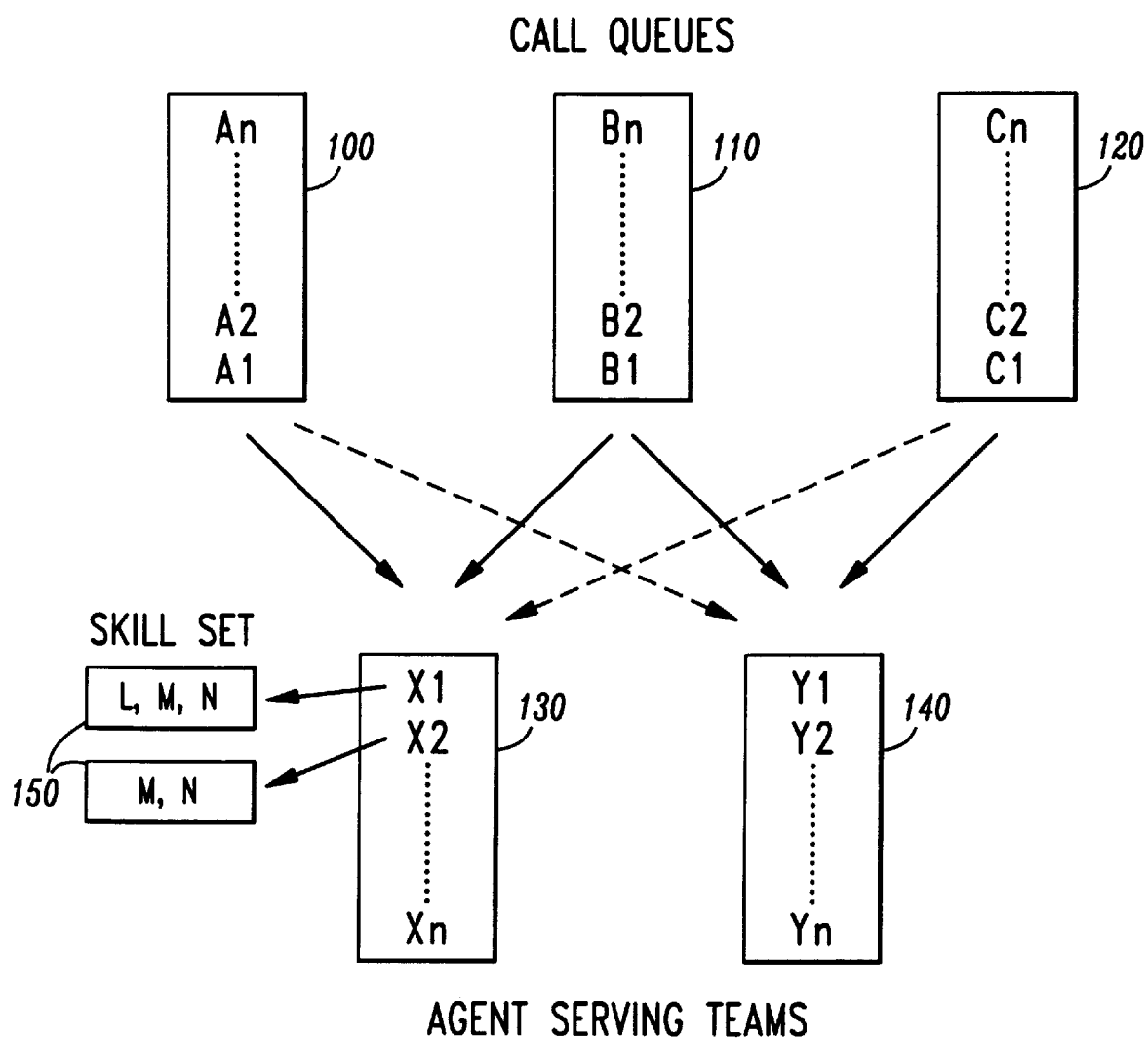
FIG. 2 is a block diagram showing call queues and agent queues implemented in accordance with the invention.

The data 47 stored in the memory 40 of FIG. 1 conventionally includes data structures representing one or more call queues and one or more agent queues on behalf of each of the ACD agent premises 15, 20 and 28. FIG. 2 illustrates three call queues 100, 110 and 120 in which calls to or from an ACD agent premises are ranked according to a priority indicator that is associated with each call and stored as part of the data 47. This idleness indicator can be based on any suitable criteria, such as longest wait time, Ratio Delay Queuing, or other known ACD routing algorithms. In FIG. 2, the calls A1, B1 and C1, which would typically be the longest waiting calls, are at the head of the call queues 100, 110 and 120, respectively. Calls An, Bn and Cn, which would typically be the shortest waiting calls, are at the tail of these respective call queues.

Each call queue typically contains calls having related but not identical requirements. For example, call queues 100, 110 and 120 may contain sales calls, support calls and warranty calls, respectively, for a manufacturing company. These call types may be identified, for the purpose of call queue assignment, according to the telephone number dialed by the caller, by an initial call screening procedure, or using other known methods. Once calls are assigned to the particular call queues 100, 110 and 120, they may be further identified based on the specific requirements that each call may have. For example, call A1 in the queue 100 may be a sales call for a product X, call A2 may a sales call for a product Y, and call An may be a sales call for a product Z. Moreover, call A1, may involve a Spanish speaking caller, while calls A2 and An may involve English speaking callers.

To denote these differing call requirements, each call listed in the call queues 100, 110 and 120 preferably has one or more associated call requirement attributes stored as part of the data 47 in the memory 40 of FIG. 1. The call requirement attributes may be determined in conventional fashion, as by the number dialed, or by an initial call screening procedure, or by other known methods.

Two exemplary agent queues are illustrated in FIG. 2 by reference numerals 130 and 140. Agent priority in each agent queue 130 and 140 is established according to an agent idleness indicator that is associated with each agent and stored as part of the data 47. The idleness indicator can be based on a variety of criteria, but is preferably based in principal part on the time that a call agent has been available (idle) to handle a call. In FIG. 2, it will be seen that agents X1 and Y1 are the most idle agents in the agent queues 130 and 140, and are at the head of their respective queues. They are the highest ranking agents relative to call assignment. The agents Xn and Yn are the least idle agents in the agent queues 130 and 140. They are the lowest ranking agents relative to call assignment.

Each agent queue 130 and 140 contains agents of a defined agent group that is known in the art as an agent serving team. Each such agent group is established to handle one or more of the call queues 100, 110 and 120. In FIG. 2, the agent queue 130 is assumed to serve as a primary agent group for the call queues 100 and 110, and as a secondary agent group for the call queue 120. The call queue 140 is assumed to serve as a primary agent group for the call queues 110 and 120 and as a secondary agent group for the call queue 100. The "primary" designation relative to an agent group refers to the fact that the agent queue corresponding to that group contains call agents who are specially qualified to handle the calls in a particular call queue. All calls in the associated call queue are assigned to the agent queue containing the primary agent group members, if possible. The "secondary" designation relative to an agent group refers to the fact that the agent queue corresponding to that group contains call agents who are somewhat qualified to handle calls in a particular call queue, so that they may be assigned such calls if no primary agent for the call queue is available.

Assuming in FIG. 2 that the call queues 100, 110 and 120 are for sales calls, support calls and warranty calls, respectively, the agent queue 130 would consist of call agents who are very knowledgeable in the sales and support areas and somewhat knowledgeable in the warranty area. Similarly, the agent queue 140 would consist of call agents who are very knowledgeable in the support and warranty areas and somewhat knowledgeable in the sales area.

Within each agent queue 130 and 140, the call agents typically have varying skills, represented by skill set vectors 150. In the agent queue 130, for example, agent X1 has a skill vector consisting of skills L, M and N. The agent X2 has a skill vector consisting of skills M and N. By way of example only, the skill L possessed by agent X1 but not by agent X2 might be the ability to speak Spanish. As will now be described, the skills associated with each agent are used in the present invention as screening attributes to make determinations about the assignment of calls from the call queues 100, 110 and 120 to agents in the agent queues 130 and 140. These screening attributes are stored in association with each agent as part of the data 47.

Figure 3:
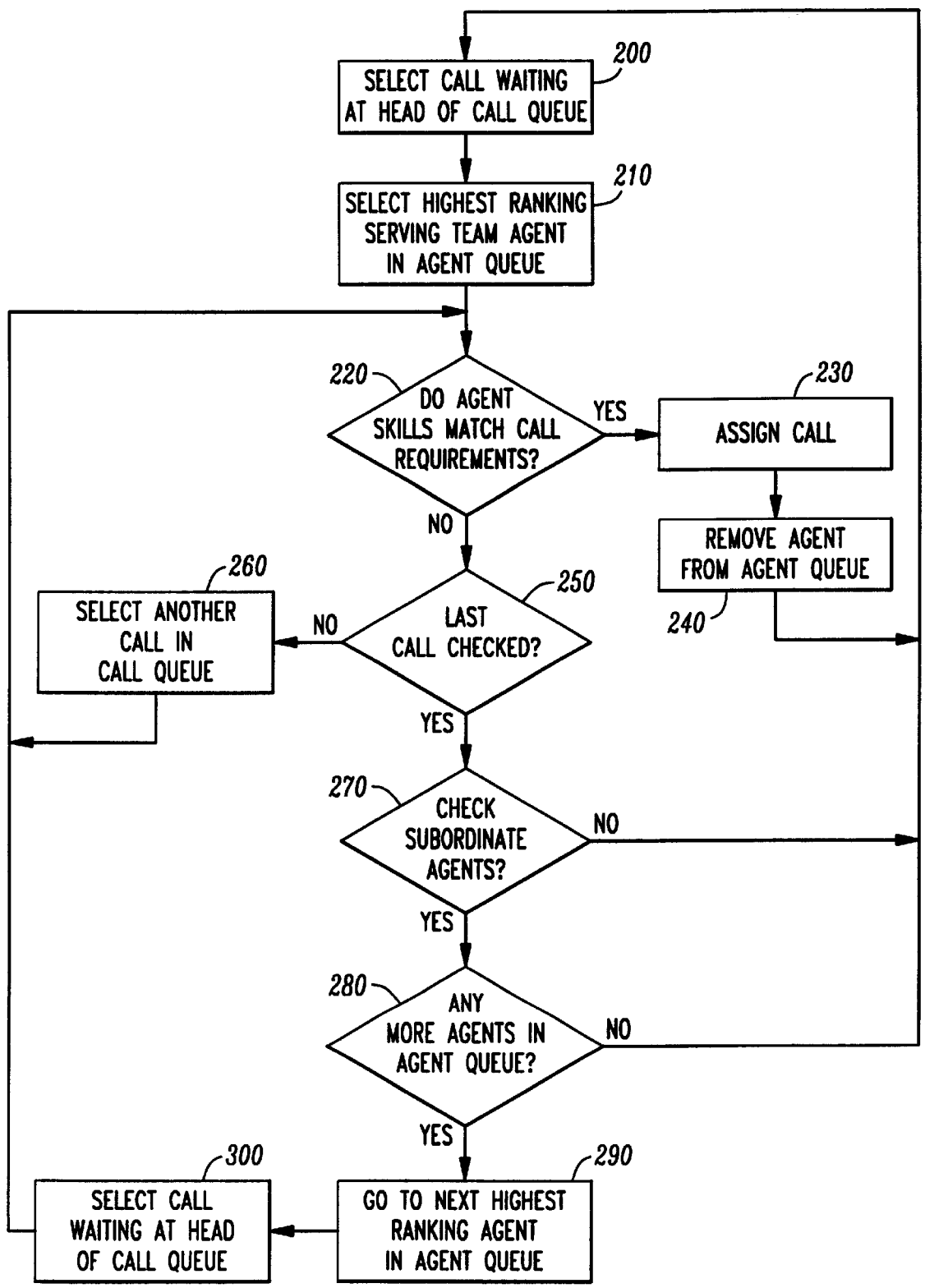
FIG. 3 is a flow diagram illustrating a call assignment procedure implemented in accordance with the present invention.

Call screening processing is performed by the call control program 46 in the processor 36 of FIG. 1. As shown now in FIG. 3, this processing begins in step 200 with a call waiting at the head of a call queue. In step 210, the highest ranking agent is located in the agent queue associated with the primary agent group assigned to handle the call queue. In step 220, a comparison is made of the screening attribute(s) of the highest ranking call agent in the agent queue with the call requirement attribute(s) of the waiting call. The comparison process seeks to achieve a call-to-agent match that will ensure some minimal level of customer satisfaction relative to the caller's call center experience. In most cases, agents in a call queue's primary agent group will have skills that meet the caller's requirements, but this will not always be the case. For example, a language difference may exist, or a call may relate to some aspect of a product that the agent is not trained to support. For secondary group agents, call-to-agent mismatches are even more likely to occur.

If, in step 220, a call-to-agent match is found, the call is assigned to the agent in step 230 and the agent is removed from the agent queue in step 240. Processing then returns to step 200 and is repeated relative to the next highest ranking agent.

If no call is found to match the highest ranking agent in step 220, the comparison process is iteratively performed using steps 260 and 270 on behalf of the highest ranking agent, while descending through lower ranking calls, until a call-to-agent match is found. During this processing, the call screening procedure "freezes" on the highest ranking agent while attempting to find a call to assign to the agent.

In the event that no call-to-agent match is found relative to the highest ranking call agent, the system decides in step 270 whether to continue testing calls on behalf of the highest ranking agent until a matching call is found. In most cases, the highest ranking agent will be temporarily bypassed as a result of this determination so that additional call-to-agent comparisons can be made relative to one or more subsequent (subordinate) call agents in the call agent queue (if any) until a call-to-agent match is found. This is shown in steps 280, 290 and 300 of FIG. 3. If a call-to-agent match is found relative to the first subordinate agent tested during this bypassing period, the call assignment is made and processing returns to the highest ranking agent. In the event that no call-to-agent match is found for the first subordinate agent, the system needs to determine in step 270 how many additional subordinate agents will be tested before returning to the highest ranking agent. This subordinate agent "count" value can be specified in advance by the call center administrator based on historical call center data. For example, step 270 can be set up so that the highest ranking agent is bypassed for one subordinate agent call screening iteration, two subordinate agent call screening iterations, and so on. The subordinate agent count value could also be dynamically determined using real-time call center information, such as the average length of time that calls are waiting in the call queues. For example, if there are long call queue wait times, more subordinate agents can be tested in the hope of finding a match than if call wait times are relatively short.

In some cases, an agent queue may be assigned to only a single call queue. In that case, call screening may include considering calls in the call queue in accordance with their call queue ranking until a call-to-agent match is found for the agent selected for call assignment. In the more normal case where the agent queue is assigned to multiple call queues, call screening will include considering calls in the multiple call queues in accordance with their overall ranking relative to other calls in the multiple call queues until a call-to-agent match is found for the agent selected for call assignment.

As stated, the call agent group members can have differing screening attributes. Some may have specialized screening attributes indicative of specialized skills in addition to a common set of non-specialized screening attributes indicative of non-specialized skills shared with other call agent group members. For example, some call agents may speak Spanish in addition to English, while other call agents speak only English. It may thus be desirable to provide a "look ahead" capability into the skill requirements of incoming calls so that an idle agent possessing potentially unique skills does not get assigned a call that requires "normal" agent skills. Rather, the system "looks ahead" in the call queue to find a high level call that requires a uniquely-skilled agent. To implement this feature, call screening (as performed in step 220 of FIG. 3) can include waiting for a call with a matching specialized call requirement attribute before assigning the call to the highest ranking (uniquely-skilled) call agent. Only if there are no calls having a matching specialized call requirement attribute will the highest ranking call agent be assigned a call having a non-specialized call requirement attribute. Thus, by way of example, a bilingual agent would not be assigned an English language call unless there are no Spanish language calls in the call queue to be assigned.

This "look ahead" processing has several advantages. First, if the uniquely-skilled call agent is simply assigned the first call in the call queue, and that call is a low level call, there may be another call in the call queue having high skill level requirements that must now wait until another uniquely-skilled agent appears. Second, the uniquely-skilled agent's skills are not spent on low requirement calls. Rather, an attempt is made to assign only high-level calls to the agent. Third, the uniquely-skilled agent will not receive a disproportionate share of calls at the expense of other less qualified call agents.

Accordingly, an ACD skill-based routing system and method have been described. While various embodiments have been disclosed, it should be apparent that many variations and alternative embodiments could be implemented in accordance with the invention. It is understood, therefore, that the invention is not to be in any way limited except in accordance with the spirit of the appended claims and their equivalents.

What is claimed is:

1. An ACD skill-based routing method, comprising the steps of:

establishing a group of call agents and assigning one or more screening attributes to each call agent group member;

establishing a call agent queue that ranks available call agent group members according to an idleness indicator;

assigning said call agent group to at least one call queue that ranks calls according to a priority indicator;

associating each call in said at least one call queue with one or more call requirement attributes;

comparing the screening attribute(s) of the highest ranking call agent identified in said call agent queue with the call requirement attribute(s) of one or more calls in said at least one call queue, beginning with the highest ranking call and descending through lower ranking calls as necessary until a call having a call requirement attribute matching said screening attribute (call-to-agent match) is found; and assigning the call associated with said call-to-agent match to said highest ranking call agent and removing said highest ranking call agent from said call agent queue.

2. An ACD skill-based routing method in accordance with claim 1 further including, in the event that no call-to-agent match is found relative to said highest ranking call agent, performing said comparing step relative to one or more subsequent call agents in said call agent queue until a call-to-agent match is found, and then performing said assigning step relative to the call associated with said call-to-agent match to assign said call to the call agent associated with said call-to-agent match.

3. An ACD skill-based routing method in accordance with claim 2 wherein, following a call-to-agent match being found relative to a call agent other than said highest ranking call agent, or following no call-to-agent match being found relative to one or more call agents other than said highest ranking call agent, re-performing said comparing step relative said highest ranking call agent.

4. An ACD skill-based routing method in accordance with claim 1 wherein said idleness indicator corresponds to the time that a call agent has been available to handle a call.

5. An ACD skill-based routing method in accordance with claim 1 wherein said priority indicator corresponds to the time that a call has been waiting for handling.

6. An ACD skill-based routing method in accordance with claim 1 wherein said call agent group is assigned to a single call queue and said comparing step includes considering calls in said call queue in accordance with their call queue ranking until a call-to-agent match is found.

7. An ACD skill-based routing method in accordance with claim 1 wherein said call agent group is assigned to multiple call queues and said comparing step includes considering the calls in said multiple call queues in accordance with their overall ranking relative to other calls in said multiple call queues until a call-to-agent match is found.

8. An ACD skill-based routing method in accordance with claim 1 wherein said call agent group m embers having differing screening attributes.

9. An ACD skill-based routing method in accordance with claim 1 wherein some of said call agent group members have specialized screening attributes indicative of specialized skills in addition to a common set of non-specialized screening attributes indicative of non-specialized skills shared with other call agent group members, and wherein said comparing step includes waiting for a call with a matching specialized call requirement attribute before invoking said assigning step to assign said call to said highest ranking call agent.

10. An ACD skill-based routing method in accordance with claim 9 wherein said comparing step further includes invoking said assigning step to assign said highest ranking call agent to a call having a matching non-specialized call requirement attribute if no call having a matching specialized call requirement attribute is found.

11. An ACD skill-based routing system, comprising:
    means for establishing a group of call agents having one or more screening attributes assigned to each call agent group member;
    a call agent queue containing rankings of available call agent group members according to an idleness indicator;
    means for assigning said call agent group to at least one call queue that ranks calls according to a priority indicator;
    means for associating each call in said at least one call queue with one or more call requirement attributes;
    means for comparing the screening attribute(s) of the highest ranking call agent identified in said call agent queue with the call requirement attribute(s) of one or more calls in said at least one call queue, beginning with the highest ranking call and descending through lower ranking calls as necessary until a call having a call requirement attribute matching said screening attribute (call-to-agent match) is found; and
    means for assigning the call associated with said call-to-agent match to said highest ranking call agent and removing said highest ranking call agent from said call agent queue.

12. An ACD skill-based routing system in accordance with claim 11 further including means, responsive to no call-to-agent match being found relative to said highest ranking call agent, for invoking said comparing means relative to one or more subsequent call agents in said call agent queue until a call-to-agent match is found, and then invoking said assigning means relative to the call associated with said call-to-agent match to assign said call to the call agent associated with said call-to-agent match.

13. An ACD skill-based routing system in accordance with claim 12 further including means, responsive to a call-to-agent match being found relative to a call agent other than said highest ranking agent, or to no call-to-agent match being found relative to one or more call agents other than said highest ranking call agent, for re-invoking said comparing means relative to said highest ranking call agent.

14. An ACD skill-based routing system in accordance with claim 11 wherein said idleness indicator corresponds to the time that a call agent has been available to handle a call.

15. An ACD skill-based routing system in accordance with claim 11 wherein said priority indicator corresponds to the time that a call has been waiting for handling.

16. An ACD skill-based routing system in accordance with claim 11 wherein said call agent group is assigned to a single call queue and said comparing means includes means for considering calls in said call queue in accordance with their call queue ranking until a call-to-agent match is found.

17. An ACD skill-based routing system in accordance with claim 11 wherein said call agent group is assigned to multiple call queues and said comparing means includes means for considering the calls in said multiple call queues in accordance with their overall ranking relative to other calls in said multiple call queues until a call-to-agent match is found.

18. An ACD skill-based routing system in accordance with claim 11 wherein said call agent group members having differing screening attributes.

19. An ACD skill-based routing system in accordance with claim 11 wherein some of said call agent group members have specialized screening attributes indicative of specialized skills in addition to a common set of non-specialized screening attributes indicative of non-specialized skills shared with other call agent group members, and wherein said comparing means includes means for waiting for a call with a matching specialized call requirement attribute before invoking said assigning means to assign said call to said highest ranking call agent.

20. An ACD skill-based routing system in accordance with claim 19 wherein said comparing means collectively further includes means for invoking said assigning means to assign said highest ranking call agent to a call having a matching non-specialized call requirement attribute if no call having a matching specialized call requirement attribute is found.

21. In an ACD system, a method for agent-equitable, skill-based call routing method, comprising the steps of:
    establishing a group of call agents and assigning one or more screening attributes to each call agent group member, some of said call agent group members having specialized screening attributes indicative of specialized skills in addition to a common set of non-specialized screening attributes also assigned to other call agent group members and indicative of skills shared with said other call agent group members;

establishing a call agent queue that ranks available call agent group members according to an idleness indicator, said idleness indicator corresponding to the time that a call agent has been available to handle a call;

assigning said call agent group to at least one call queue that ranks calls according to a priority indicator, said priority indicator corresponding to the time that a call has been waiting for handling;

associating each call in said call queue(s) with one or more call requirement attributes;

comparing the screening attribute(s) of the highest ranking call agent identified in said call agent queue with the call requirement attribute(s) of one or more calls in said at least one call queue, beginning with the highest ranking call and descending through lower ranking calls as necessary until a call having a call requirement attribute matching said screening attribute (matching call requirement attribute) is found;

if said matching call requirement attribute matches one of said non-specialized screening attributes and said highest ranking call agent does not also have a related specialized screening attribute, assigning the call associated with said matching call requirement attribute to said highest ranking call agent and removing said highest ranking call agent from said call agent queue;

if said matching call requirement attribute matches one of said non-specialized screening attributes and said highest ranking call agent also has an associated specialized screening attribute, continuing said comparing step until a next call having a matching call requirement attribute is found;

if no matching call requirement attribute is found for any call, re-performing said comparing step relative to one or more subordinate call agents in said call agent queue until a call having a matching call requirement attribute is found or until a selected number of subordinate agents has been tested, whichever occurs first;

if a call having a matching call requirement attribute is found relative to a subordinate agent, assigning said call to said subordinate call agent; and following said call assignment to said subordinate call agent, or upon no matching call requirement attribute being found for said selected number of subordinate agents, re-performing said comparing step relative to said highest ranking call agent.

\* \* \* \* \*